United States Patent Office 3,558,750
Patented Jan. 26, 1971

3,558,750
METHOD OF MAKING NUCLEAR FUEL BODIES
Dwight E. Davis, Escondido, Dennis W. Stevens, San Diego, and Geoffrey R. Tully, Jr., Poway, Calif., assignors to the United States of America as represented by the United States Atomic Energy Commission
No Drawing. Filed Feb. 7, 1968, Ser. No. 703,573
Int. Cl. G21c 21/00
U.S. Cl. 264—.5                                              7 Claims

ABSTRACT OF THE DISCLOSURE

A method for making nuclear fuel bodies using coated nuclear fuel particles. A chamber of the desired size is filled with a packed bed of coated particles which may be compacted to a desired density. A carbonaceous binder including an organic resin plus filler is injected into the chamber under sufficient fluid pressure to flow through and occupy the interstices of the packed particulate bed. Curing of the resin and subsequent pyrolysis provides a solid carbonaceous nuclear fuel body. The body may be formed in situ within a fuel chamber of a fuel element portion.

---

The invention described herein was made in the course of, or under, Contract AT(04-3)-633 with the United States Atomic Energy Commission.

The present invention relates to nuclear fuel bodies for use in nuclear reactors, and more particularly to fuel bodies made from particulate nuclear fuel for use in high temperature nuclear reactors.

In making fuel elements for nuclear reactors, there are advantages to employing particulate nuclear fuel in the form of packed beds of fuel particles. However, leaving the fuel particles loose within a fuel element may be undesirable for safety reasons, should fracture of a fuel element occur. The chance that the particles might be distributed throughout the reactor in the event of an accident is avoided by bonding the particles together. Also, heat transfer is more efficient in a bonded bed of fuel particles because of the absence of void space.

In nuclear reactors which operate at high power levels and which utilize fluid cooling to extract the heat from fuel elements in the reactor core, it is considered important to obtain efficient heat transfer from the nuclear fuel to the collant stream. The more efficient heat transfer characteristics a fuel element has, the lower the fuel temperature in the element that may be maintained to transfer to the coolant stream a given quantity of heat per unit time. Lower fuel temperatures permit longer fuel cycles and, consequently, lower reactor operating cost.

It is desirable to provide efficient and effective methods for making fuel bodies containing beds of bonded nuclear fuel particles, and more particularly for forming such fuel bodies in situ in a fuel element portion.

Accordingly, it is an object of the present invention to provide improved methods for making nuclear fuel bodies. It is another object of the present invention to provide methods for making fuel bodies containing packed beds of bonded fuel particles which are uniform in formation throughout. A still further object of the present invention is to provide a method to facilitate the manufacture of densely loaded nuclear fuel bodies. Still another object is to provide an improved method for making bodies containing nuclear fuel particles in situ in a fuel element portion made of graphite.

These and other objects of the invention are more particularly set forth in the following detailed description.

Generally, the invention provides methods for making fuel bodies wherein nuclear fuel particles are loaded into a fuel chamber of a fuel element or into the cavity of a mold and densified to the desired extent and then are bonded to one another. The bonding is accomplished using a suitable fluid organic binder which, when pyrolyzed, provides sufficient residual strength to hold the particles together in the form of a solid fuel body at high temperatures. Depending upon the subsequent reprocessing treatment intended, one may wish to choose a binder which is of such a nature that it may be readily removed by suitable subsequent treatment in order to recover the fuel particles in discrete form without injury to their coatings. Recovery in this manner permits mechanical separation before subsequent reprocessing, and such procedure is employed in the methods of fuel management shown in U.S. Pat. No. 3,208,912.

It is possible to achieve both uniformity of loading and relatively dense loadings by filling a fuel chamber or a mold cavity with discrete fuel particles in the absence of bonding material. By using tamping, vibration compaction or the like, such particles can be packed to high densities. Moreover, examination is possible after filling to confirm the completeness of the loading. Furthermore, loading precisely to desired densities is facilitated because the amount of particulate nuclear fuel material can be measured prior to loading and the compaction regulated until that amount of particles just fills the fuel chamber or mold cavity.

The filling of the fuel chamber or mold cavity with the particulate fuel in discrete form also facilitates the uniform loading of particles of two or more different groups of particles. If mixing of such particles were made and the mixture then combined with a suitable binder and injected into a chamber as a paste, there is no assurance that the same distribution of particles will remain in the final product. This is particularly true when the sizes of the particles of the different groups are different (to permit subsequent mechanical separation by screening), it is likely changes will occur in the distribution of particles in different regions while injection is taking place that will make the resultant final distribution less than uniform. However, after a uniform mixture of two or more groups of particles has been loaded into a fuel chamber, the uniform distribution will not be altered by passage of the binder through the interstices of the particles.

As used herein, the term "nuclear fuel" refers both to fissile materials, such as uranium 233, uranium 235, plutonium 239, and compounds thereof, and to fertile materials, such as thorium 232, uranium 238 and compounds thereof. It may be desirable to use a mixture of fuel particles including one group that is primarily fissile and another group that is fertile material, which two groups may be separated from each other prior to chemical reprocessing. For example, thorium dicarbide may be used as the fertile particles, and a mixture of uranium dicarbide and a diluent (such as thorium dicarbide, graphite, or beryllium carbide) may be used as the fissile materials.

The particles are less than 1000 microns in size, and preferably they are spheroids. Usually, each particle will have its own coating which serves as an individual pressure vessel in retaining therewithin the gaseous fission products generated. Examples of suitable coatings of this type are disclosed in U.S. Pat. No. 3,298,921, issued Jan. 17, 1967. As one example, an inner layer of spongy, porous pyrolytic carbon is used, surrounded by an outer layer of dense isotropic pyrolytic carbon. A refractory metal carbide layer may also be used to provide added fission product retentivity, for example a layer of dense silicon carbide.

A suitable binder is used which provides a solid fuel body having adequate strength at reactor operating temperatures. In order to best complement, from a nuclear standpoint, the characteristics of the reactor, the binder should be carbonaceous so that after pyrolysis it leaves a carbon framework which forms a matrix enclosing all the particles. Binders which may be employed include thermoplastic materials, such as pitch, which would be used in molten form, and organic polymeric thermosetting materials or resin. For certain applications mentioned above, it is preferable that the binder when pyrolyzed provide a carbon residue which is more easily oxidized than the coating materials covering the nuclear fuel particles. Phenolic-type resins are preferred because they provide a high percentage of carbon residue per weight percentage of initial resin, a factor that is definitely advantageous in providing a fuel body of adequate strength.

One of the reasons why it is preferred to use resins which provide a high percentage of carbon residue when pyrolyzed is that resins having high percentages of volatile materials undergo considerable shrinkage during pyrolysis. Nonvolatile carbonaceous filler material, such as graphite powder, is usually used in combination with a resin and provides a stronger bond than if the resin alone were used because the presence of carbonaceous filler material which does not pyrolyze reduces the overall shrinkage of the binder during pyrolysis. Filler materials should be stable at reactor operating temperatures and have suitable neutron cross sections. Preferred filler materials are graphite powder and activated carbon or charcoal. Activated carbon improves retention in the fuel body of heavy metal fission products. Sufficient filler material is generally used so that the filler provides at least about 50 weight percent of the residue after the resin is pyrolyzed. However, filler material may be used at a level of from about 80 percent to about 20 percent of the total weight of the residue of filler and pyrolyzed resin, depending upon the strength of the carbon residue provided by the particular resin.

Realizing that shrinkage will occur in the binder, it is important that this shrinkage should not be allowed to cause cracking of the fuel particle coatings. An organic resin has a tendency to form a fairly good bond to various materials upon its curing. If such a resin also undergoes a fair amount of shrinkage upon pyrolysis, this bond might well promote cracking. It has been found that such cracking is prevented by coating the fuel particles each with a suitable bond release agent such as commercially available powdered graphite, which is available in sprayable form, or a high melting point wax. This release agent prevents the establishment of a complete bond with the fuel particle coating material during curing and is effective in preventing damage to the fuel particle coatings from cracking.

Loading of the coated fuel particles into the fuel chamber of a fuel element portion or mold cavity is effected by any suitable method which assures the desired distribution and density of loading. After the fuel particles are packaged to the desired fuel density, a fluid mixture of resin-filler material is then injected under pressure into the fuel chamber or mold cavity to fill the void space in the packed bed of fuel particles. If a mold is used, it may be made of any suitable material which has sufficient strength and which is not reactive at the curing temperatures of the binder, i.e., at least about 150° C. Stainless steel molds are usually employed.

When the fuel body is formed in situ, the material of the fuel element portion containing the fuel chamber should have like characteristics. Graphite having sufficient porosity to facilitate the escape of the volatiles created during pyrolysis and to withstand the fluid pressures present during injection of the binder is considered excellent. In this respect, graphite having a porosity of at least about 0.1 cm.$^2$/sec., measured with helium at 20° C. and ½ atmosphere, is used.

For some applications, there may be advantages to forming the fuel bodies in molds and then inserting them into fuel chambers in a fuel element portion. As previously indicated, there is some shrinkage which occurs during curing and pyrolysis of the organic resin, which shrinkage accordingly results in a lessening of the dimensions of the fuel body during the transition from its green form to its final pyrolyzed form. Thus, making the fuel bodies in a mold allows a closer matching of the fuel body to the dimensions of the fuel chamber. The fuel bodies which are made in molds may be bonded to the walls of the fuel chamber with a suitable glue, for example, coal tar pitch or a thermosetting resin.

Any suitable device for injecting the fluid binder into the mold cavity or fuel chamber may be used. Hydraulic, pneumatic or mechanical pressure may be used. For example, an ordinary grease gun may be used with a suitable seal between it and the mold or fuel element portion. The injection device needs only to be capable of supplying the amount of pressure required to force the fluid bind to flow the total length of the fuel body. The amount of pressure required is a function of the length of the fuel body, the viscosity of the fluid binder and the size and packing density of the fuel particles. For production of fuel bodies in the range of about 15 to 30 inches long and ½ inch in diameter, pressures needed will probably be between about 500 p.s.i. and about 1400 p.s.i. Even higher pressures might be used to decrease filling times in certain situations.

When making a fuel body in a stainless steel mold, there is no reason to have particular concern with the amount of pressure necessary, for the mold can surely withstand any pressures that might be reasonably achieved. However, when making the fuel body in situ, for example, in a chamber in a graphite block, the viscosity of the binder should be controlled to allow fuel bodies of reasonable length and fuel density to be made without danger of causing cracking of the graphite fuel element portion that might subsequently cause deterioration and/or failure of the fuel element. Viscosity can be controlled by choice of the resin used, amount of charcoal or graphite added, and the temperature at which the binder is injected. When injecting binder into a fuel chamber about ½ inch in diameter circular cross section and of a length of at least 15 inches, which is formed in a block of graphite of suitable characteristics, the viscosity of the binder employed is preferably not higher than about 500,000 centipoise.

There is one further consideration when forming the fuel body in situ, within the chamber of a porous graphite fuel element portion. If the fuel chamber is fairly long, say longer than about 20 inches, the resin has a tendency to seep into the sidewall of the fuel chamber. Loss of resin from the binder in this manner may result in nonuniformity in the final matrix and may also result in an actual blockage within the fuel chamber as a result of an accumulation of filler at a location where a substantial amount of the resin has been dissipated through outward seepage.

It has been found that this probelm can be solved by sealing the interior sidewall of the fuel chambers with a suitable resin which is polymerized prior to filling with the fuel particles. Generally, any type of a thermosetting resin can be employed, such as a phenolic resin or furfuryl alcohol. By treating the sidewalls with a carbonaceous substance of this type, outward seepage of the resin from the binder is prevented while the porosity of the graphite to the volatiles is not substantially altered. This is particularly true because such a resin likewise will pyrolyze and thus further open the pores wherein it is initially located. Furthermore, by treating the fuel chamber sidewall and curing the resin with which it is treated, the graphite body is strengthened in the immediate location where the stresses will be the greatest during the injection of the binder. Accordingly, treatment with such a thermosetting resin not only facilitates smooth injection of the binder throughout the length of the chamber, but it also provides additional strength to withstand the stresses caused by the high pressure at which injection is performed.

The following example further illustrates various features of the present invention but is intended to in no way limit the scope thereof which is defined solely by the appended claims.

EXAMPLE

Fissile and fertile fuel particles are prepared containing uranium and thorium dicarbides. The fuel particles are spheroids with average diameters of 200 microns and 400 microns, respectively. The fuel particles are coated with pyrolytic carbon by pyrolysis of gaseous hydrocarbon. The coated fuel particles are loosely packed into the cavity of a stainless steel mold and are vibrated to effect a density of about 64 volume percent. The cavity is 15 inches long and has a diameter of ½ inch.

A resin-filled mixture is prepare dcontaining 70 weight percent of diluted Plyophen 5023-speciial phenolformaldehyde resin, 20 weight percent graphite and 10 weight percent charcoal. The mixture has a viscosity of about 500,000 centipoise. Less than 2 percent of the graphite and charcoal is over 30µ in size. The charcoal has a surface area of 1000 m.²/gm., as determined by the BET nitrogen method. This resin provides a carbon residue about 55–60 percent of its weight.

One end of the mold is connected to an injection device that is loaded with the binder mixture while the opposite end of the cavity is closed with a porous plate which allows gas to escape therethrough but closes the cavity otherwise. The injection device includes a nozzle which is adapted to seal against one end of the mold and a reservoir into which the binder is loaded, each of which are connected to an intermediate chamber by check valves. A plunger connected to a double-acting hydraulic cylinder is reciprocally mounted for travel within the intermediate chamber. The intermediate chamber is filled by withdrawing the plunger to cause the binder in the reservoir to flow thereinto. Then, by driving the plunger in the opposite direction, the resin-filled mixture is injected through the nozzle into the cavity under pressure which is sufficient to cause it to flow through the interstices of the packed bed and fill the void spaces between the coated particles of nuclear fuel. Flow of the viscous binder is necessarily quite slow so the full amount of power available to the hydraulic cylinder will be used. For this filling, the pressure in the nozzle reaches about 960 p.s.i. Complete filling of the mold cavity takes about 30 minutes.

A fuel element portion in the form of a block of graphite of circular cross section approximately three inches in diameter and 31 inches long is provided with four fuel chambers each about ½ inch in diameter and 30 inches long, the centers of which lie symmetrically on a circle of a radius of about ¾ inch. The axes of the four fuel chambers are parallel to the axis of the graphite cylinder. The graphite has a porosity of about 0.1 cm.² sec., measured with helium at 20° C. and ½ atmosphere. The rod with the four fuel chambers formed therein is immersed in a bath of a mixture consisting of ten moles of furfuryl alcohol to one mole of maleic anhydride and is allowed to soak therein for 120 minutes. It is removed, drained of the excess of the mixture, and heated to 100° C. for 90 minutes to cure the resin.

The four fuel chambers are then filled with coated fuel particles to a density of about 64 volume percent in the same manner as the mold identified above.

The phenolic resin-graphite-charcoal mixture described above is injected simultaneously into the four fuel chambers using the same injection device. Again the nozzle pressure reaches about 960 p.s.i. Total filling of all four of the fuel chambers takes about 1½ hours.

Both the mold and the fuel element portion, which are now filled with particles and binder, are placed in a furnace and heated to a temperature of about 90° C. for about sixteen hours, followed by four hours at 120° C., to cure the resin. During the heating, the ends of the fuel chambers are closed to prevent any flow of the binder axially out of the chambers. The fairly small amount of volatiles generated are permitted to escape from the green fuel body in the cavity via porous plugs at each end of the mold.

After heating has been completed, the mold and fuel element section are allowed to cool slowly to room temperature. The cured fuel body is removed from the mold cavity and placed in a holder made of porous graphite. The holder is in the form of a split tube of porous graphite having an inner diameter which is very slightly oversize to the outer diameter of the cured fuel body. The ends of the split tube holder are threaded, and after the holder has been slipped into a suitable constraining hole in a container, end plugs are threaded into each end to abut and restrain the ends of the fuel body during pyrolysis.

The container plus the fuel element portion are returned to a furnace, and pyrolysis is begun under a dry nitrogen atmosphere. A slow rate of temperature rise is maintained throughout the range wherein the major portion of the decomposition occurs in order to prevent a large discharge of volatiles from possibly causing disruption of the matrix being formed. The temperature is raised to about 150° C. over an hour's time. In the next three hours, the temperature is raised to 250° C. The temperature rise is then slowed to about 10° C. per hour so that it takes about twenty-five more hours for 500° C. to be reached. In the next three hours, the temperature is raised to 600° C., and thereafter a rate of about 50° C. per hour is used so that 900° C. is reached in six hours. The temperature is held at 900° C. for one hour, and then the furnace is allowed to cool slowly. About seven to eight hours is allowed to reach room temperature. At the end of this time, the carbonized fuel body is removed from the porous holder.

Examination of the fuel body shows that it is of uniform character throughout, and it is considered to be well suited for use in a nuclear reactor. Examination shows that the fuel element section is free of cracking and in good condition. The assembly is considered suitable for use in a nuclear reactor in its present form.

Various of the features of the invention are set forth in the following claims.

What is claimed is:

1. A method of making a solid nuclear fuel body, which method comprises providing a chamber that defines the approximate size and shape of the desired fuel body, loading said chamber with particulate nuclear fuel to the desired density thereof, forcing a fluid binder under pressure into said loaded chamber in a manner to cause said binder to flow through said loaded particulate nuclear fuel and uniformly fill said chamber by occupying the interstices of said fuel particles, and heating said uniform aggregate of fuel particles and binder for a temperature and time sufficient to pyrolyze said binder and form a solid fuel body.

2. A method in accordance with claim 1 wherein said chamber is a cavity in a nuclear fuel element portion made of refractory material of sufficient porosity to permit the passage of volatiles therethrough.

3. A method in accordance with claim 2 wherein fuel element portion is made of graphite having a porosity of at least about 0.1 cm.²/sec. measured with helium at 20° C. and ½ atmosphere.

4. A method in accordance with claim 1 wherein said binder contains a thermosetting resin having a high solids content that results in at least about 50 weight percent carbon after carbonization.

5. A method in accordance with claim 1 wherein said binder contains a thermosetting resin, wherein said resin is cured in said chamber, and wherein said aggregate of cured binder and particles is removed from said chamber and pyrolyzed in a closely fitting holder made of porous material.

6. A method in accordance with claim 2 wherein the wall surface of said chamber is treated with a suitable sealant to substantially close the pores thereof prior to particle loading and binder injection.

7. A method in accordance with claim 6 wherein said sealant is an organic substance which pyrolyzes during pyrolysis of said binder.

References Cited

UNITED STATES PATENTS

| | | | |
|---|---|---|---|
| 3,028,330 | 4/1962 | Justheim et al. | 264—0.5 |
| 3,208,912 | 9/1965 | Jaye et al. | 176—16 |
| 3,298,921 | 1/1967 | Bokros et al. | 176—91 |
| 3,309,434 | 3/1967 | Blum et al. | 264—0.5 |
| 3,310,611 | 3/1967 | Zocher | 264—0.5 |
| 3,439,073 | 4/1969 | Howard et al. | 264—0.5 |

CARL D. QUARFORTH, Primary Examiner

S. HELLMAN, Assistant Examiner